(12) United States Patent
Kim et al.

(10) Patent No.: US 12,061,549 B1
(45) Date of Patent: Aug. 13, 2024

(54) MULTIPROCESSOR SYSTEM AND DATA MANAGEMENT METHOD THEREOF

(71) Applicant: MetisX CO., Ltd., Yongin-si (KR)

(72) Inventors: Do Hun Kim, Yongin-si (KR); Kee Bum Shin, Yongin-si (KR); Kwang Sun Lee, Yongin-si (KR)

(73) Assignee: MetisX CO., Ltd., Yongin-si (KR)

( * ) Notice: Subject to any disclaimer, the term of this patent is extended or adjusted under 35 U.S.C. 154(b) by 0 days.

(21) Appl. No.: 18/637,136

(22) Filed: Apr. 16, 2024

(30) Foreign Application Priority Data

Apr. 19, 2023 (KR) .................. 10-2023-0051366

(51) Int. Cl.
*G06F 12/08* (2016.01)
*G06F 12/0811* (2016.01)
*G06F 12/0871* (2016.01)
*G06F 12/0891* (2016.01)

(52) U.S. Cl.
CPC ...... *G06F 12/0811* (2013.01); *G06F 12/0871* (2013.01); *G06F 12/0891* (2013.01)

(58) Field of Classification Search
CPC ............ G06F 12/0811; G06F 12/0871; G06F 12/0891
See application file for complete search history.

(56) References Cited

U.S. PATENT DOCUMENTS

| 5,708,792 | A | 1/1998 | Hayes et al. | |
|---|---|---|---|---|
| 2002/0083312 | A1* | 6/2002 | Sinharoy | G06F 9/3848 712/240 |
| 2019/0155733 | A1 | 5/2019 | Hagersten | |

FOREIGN PATENT DOCUMENTS

| KR | 10-0294105 B1 | 9/2001 |
|---|---|---|
| KR | 10-1639943 B1 | 7/2016 |
| KR | 10-1747894 B1 | 6/2017 |
| KR | 10-2019-0058317 A | 5/2019 |
| WO | 2013/109648 A1 | 7/2013 |

OTHER PUBLICATIONS

"Request for the Submission of an Opinion" Office Action issued in KR 10-2023-0051366; mailed by the Korean Intellectual Property Office on Aug. 1, 2023.

(Continued)

*Primary Examiner* — Jae U Yu
(74) *Attorney, Agent, or Firm* — Studebaker & Brackett PC

(57) ABSTRACT

A multiprocessor system includes a plurality of processors, a first cache device corresponding to a first processor of the plurality of processors and including a first cache memory configured to store a plurality of first cache lines, and a second cache device at different level than the first cache device, corresponding to the plurality of processors, and including a second cache memory that stores a plurality of second cache lines, in which the first cache device is configured to, in response to a request related to data access, search the first cache memory for data, and the second cache device is configured to, in response to the data cache-missed in the first cache memory, search the second cache memory for data, and in response to the data cache-hit in the second cache memory, set cache line of the second cache memory corresponding to the data as clean cache line.

11 Claims, 9 Drawing Sheets

(56) References Cited

OTHER PUBLICATIONS

"Notice of Final Rejection" Office Action issued in KR 10-2023-0051366; mailed by the Korean Intellectual Property Office on Dec. 6, 2023.
"Written Decision on Registration" Office Action issued in KR 10-2023-0051366; mailed by the Korean Intellectual Property Office on Feb. 16, 2024.

* cited by examiner

MULTIPROCESSOR SYSTEM AND DATA MANAGEMENT METHOD THEREOF

CROSS-REFERENCE TO RELATED APPLICATION

This application claims priority under 35 U.S.C. § 119 to Korean Patent Application No. 10-2023-0051366, filed in the Korean Intellectual Property Office on Apr. 19, 2023, the entire contents of which are hereby incorporated by reference.

TECHNICAL FIELD

The present disclosure relates to a multiprocessor system and a data management method thereof.

BACKGROUND

In a computing system, a cache memory may be formed of several levels. For example, it may include levels L1, L2, and L3 (or L0, L1, and L2) in order close to the CPU. Each cache memory may be selectively designed as a write-back or write-through method depending on the purpose. In many cases, the memory may be designed as the write-back method that is known to have good performance.

In addition, each cache memory may be classified as an exclusive method or an inclusive method depending on data inclusion relationship between each other. Regarding the relationship between the L1 cache and the L2 cache, the exclusive method may refer to a structure that guarantees that data in the L1 cache is not present in the L2 cache. That is, the L1 cache and the L2 cache are in an exclusive relationship with each other. On the other hand, the inclusive method does not necessarily guarantee that the data in the L1 cache is not present in the L2 cache.

In many cases, the inclusive method is adopted, so that data present in the L1 cache may or may not be present in L2. If the L1 cache and the L2 cache have the same data, it will lead to duplicated use of the cache memory resources which are limited, and the efficiency may be lowered. If the exclusive method is adopted, if data in the L1 cache is not in the L2 cache, the probability of L2 cache hit may decrease when L1 cache miss occurs. Because the L2 cache is larger and has a larger access delay than the L1 cache, there may be disadvantages in designing the memory with the exclusive method only. As described above, in a system-on-chip (SoC) design, for example, determining multiple levels of the cache memory and determining their methods or capacities may greatly affect the overall performance of the system.

SUMMARY

In order to solve one or more problems (e.g., the problems described above and/or other problems not explicitly described herein), a technical object of the present disclosure is to provide a mechanism for optimizing the performance of a cache memory.

A technical object of the present disclosure is to provide a hybrid method for a cache memory, which appropriately combines an inclusive method and an exclusive method, for example, to provide an inclusive method-based mechanism that partially incorporates the characteristics of the exclusive method.

A technical object of the present disclosure is to reduce the frequency of flushing without lowering the cache hit rate of the lower level cache memory, thereby improving the overall performance of the system. The present disclosure may be implemented in various ways including an apparatus, a system, a method, or a computer program stored in a readable storage medium.

As an aspect of the present disclosure, a multiprocessor system is disclosed. The system may include a plurality of processors, a first cache device corresponding to a first processor of the plurality of processors, and including a first cache memory configured to store a plurality of first cache lines, and a second cache device at a different level than the first cache device, corresponding to the plurality of processors, and including a second cache memory configured to store a plurality of second cache lines, in which the first cache device may be configured to, in response to a request related to data access, search the first cache memory for data, and the second cache device may be configured to, in response to the data being cache-missed in the first cache memory, search the second cache memory for the data, and in response to the data being cache-hit in the second cache memory, set a cache line of the second cache memory corresponding to the data as a clean cache line.

A multiprocessor system according to another aspect of the present disclosure may include a plurality of processors, a first cache memory corresponding to each of the plurality of processors, a first cache controller configured to read data from the first cache memory or write data to the first cache memory, a second cache memory corresponding to the plurality of processors, and a second cache controller configured to read data from the second cache memory or write data to the second cache memory, in which the first cache controller may be configured to receive a request related to data access from a first processor of the plurality of processors, in response to the request, search the first cache memory corresponding to the first processor for the data, and the second cache controller may be configured to, in response to the data being cache-missed in the first cache memory, search the second cache memory for the data, and in response to the data being cache-hit in the second cache memory, set a cache line of the second cache memory corresponding to the data as a clean cache line.

According to another aspect of the present disclosure, a data management method of a system may be provided, in which the system may include a plurality of processors, a first cache memory corresponding to a first processor of the plurality of processors, and a second cache memory at a different level than the first cache memory and corresponding to the plurality of processors. The method may include, in response to a request related to data access generated by the first processor, searching the first cache memory for the data, in response to the data being cache-missed in the first cache memory, searching the second cache memory for the data, and in response to the data being cache-hit in the second cache memory, setting a cache line of the second cache memory corresponding to the data as a clean cache line.

According to various examples of the present disclosure, it is possible to provide a multiprocessor system and a data management method thereof with optimized cache memory performance.

According to various examples of the present disclosure, it is possible to provide a multiprocessor system having the advantages of both the inclusive method and the exclusive method by providing a hybrid method mechanism combining the inclusive method and the exclusive method appropriately in the cache memory.

According to various examples of the present disclosure, by reducing the frequency of flushing, it is possible to improve the overall performance of the multiprocessor system without reducing the cache hit rate of the lower level cache memories.

According to various examples of the present disclosure, it is possible to improve efficiency of the system by avoiding duplicate use of the cache memory resources which are limited.

The effects of the present disclosure are not limited to the effects described above, and other effects not described herein can be clearly understood by those of ordinary skill in the art (hereinafter referred to as "ordinary technician") from the description of the claims.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
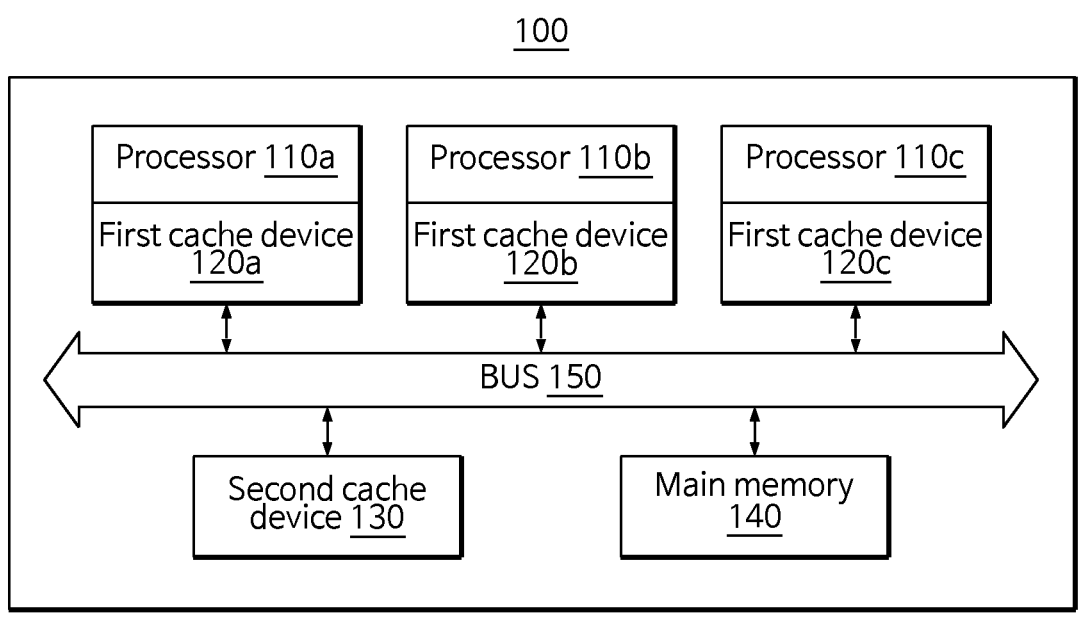
FIG. 1 is a block diagram of a multiprocessor system.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. The memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

Figure 2:
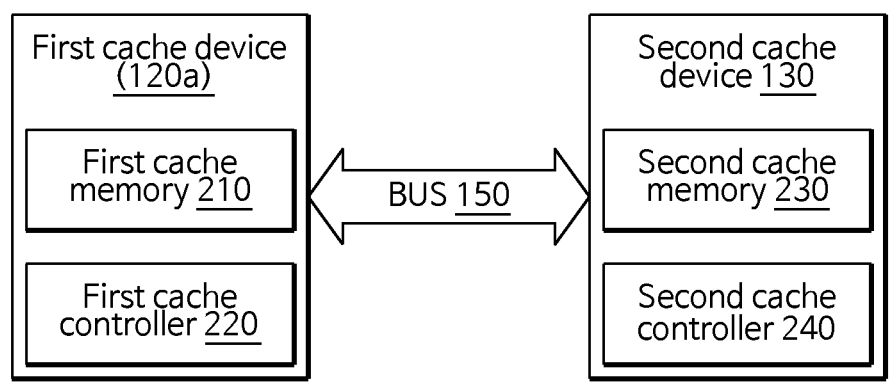
FIG. 2 is a block diagram of a first cache device and a second cache device.

FIG. 1 is a block diagram of a multiprocessor system 100. In addition, FIG. 2 is a block diagram of a first cache device and a second cache device.

The multiprocessor system 100 may be related to a server, a user terminal, a personal computer, a portable computer, etc. The multiprocessor system 100 may include a plurality of processors 110a, 110b, and 110c. The plurality of processors 110a, 110b, and 110c may be x86 CPUs, ARMs, RISC-Vs, etc. In addition, the plurality of processors 110a, 110b, and 110c may be Domain Specific Architecture (DSA) processors designed to drive specific applications more efficiently.

The multiprocessor system 100 may include several levels of cache devices. For example, it may include a small and fast high-level cache device that is relatively close to the processors 110a, 110b, and 110c, and a large and slow low-level cache device that is relatively close to a main memory 140. As illustrated in FIG. 1, the multiprocessor system 100 may include first cache devices 120a, 120b, and 120c as the high-level cache devices, and may include a second cache device 130 as the low-level cache device. Each of the first cache devices 120a, 120b, and 120c and the second cache device may include a cache memory and a cache controller. As illustrated in FIG. 2, the first cache device 120a may include a first cache memory 210 and a first cache controller 220, and the second cache device 130 may include a second cache memory 230 and a second cache controller 240.

The multiprocessor system 100 may be a system in which each of the processors 110a, 110b, and 110c is allocated the first cache devices 120a, 120b, and 120c as its first-level private caches (i.e., L1 caches). The first cache devices 120a, 120b, and 120c may be memories in which the space for the data unit may respond only to activities of the processors 110a, 110b, and 110c corresponding to the corresponding first cache memory. In other words, the first cache memory 210 may correspond to the processor 110a. The first cache memory 210 may store a plurality of cache lines.

The second cache device 130 may be at a different level from the first cache devices 120a, 120b, and 120c, and may correspond to the plurality of processors 110a, 110b, and 110c. In the present disclosure, it may be described that the first cache memory 210 is at a "higher level" than the second cache memory 230, and that the second cache memory 230 is at a "lower level" than the first cache memory 210. The second cache memory 230 may include data and commands shared by the plurality of processors 110a, 110b, and 110c and accessed by the plurality of processors 110a, 110b, and 110c. The second cache memory 230 may be a global cache because the space for the data unit may be formed in response to activities of any of the processors 110a, 110b, and 110c. In addition, the second cache memory 230 may be a shared cache in that each data unit may only be present as one shared copy, while the first cache memory 210 may have its own duplicate copy. The second cache memory 230 may store a plurality of cache lines.

The first cache memory 210 and the second cache memory 230 may be of the write-back type. The first cache memory 210 may be of read-allocate write-back type, and the second cache memory 230 may be of write-allocate write-back type. The first cache memory 210 may be of write-allocate write-back type, and the second cache memory 230 may be of read-allocate write-back type.

The multiprocessor system 100 may include the main memory 140. The main memory 140 may store commands and data accessed by the plurality of processors 110a, 110b, and 110c. The main memory 140 may be a DIMM type DRAM, for example.

The multiprocessor system 100 may include a bus 150. The bus 150 may provide a communication function between components of the multiprocessor system 100. The bus 150 may be implemented as various types of buses such as an address bus, a data bus, a control bus, etc.

In the multiprocessor system 100, the data access request may be processed much faster when the corresponding data is present in the cache memory than when it is not. In other words, the processing time for the data access request may be much shorter for a cache hit than a cache miss. The term "cache hit" as used herein may refer to a situation in the processing of the requests related to data access, in which corresponding data is found and processed in the cache memory. In addition, the term "cache miss" as used herein may refer to a situation in the processing of the requests related to data access, in which the data is not found in the cache memory and read from other memories (e.g., lower level cache memory, the main memory 140, etc.).

The multiprocessor system 100 reduces the cache misses so that an application executed on the processors 110a, 110b, and 110c may be executed faster and with less energy consumption. In addition, the multiprocessor system 100 may avoid duplicate use of the cache memory resources which are limited, thereby improving efficiency.

In FIGS. 1 and 2, components related to the description of certain examples are illustrated. Accordingly, those of ordinary skill in the art to which the present disclosure pertains will be able to recognize that other general-purpose components may be further included in addition to the components illustrated in FIGS. 1 and 2. For example, the multiprocessor system 100 may further include one or more auxiliary storage devices (e.g., SSD, HDD), a communication interface, additional cache memory at different levels, etc., and the first cache device and the second cache device may further include a scheduler, etc.

FIG. 2 illustrates that the first cache controller 220 is included in the first cache device 120a, and the second cache controller 240 is included in the second cache device 130. However, the present disclosure is not limited to this example, and the first cache controller 220 and the second cache controller 240 may be implemented outside the first cache device 120a and the second cache device 130, respectively. In addition, at least some functions of the first cache controller 220 and the second cache controller 240 may be implemented in an integrated manner.

Figure 3:
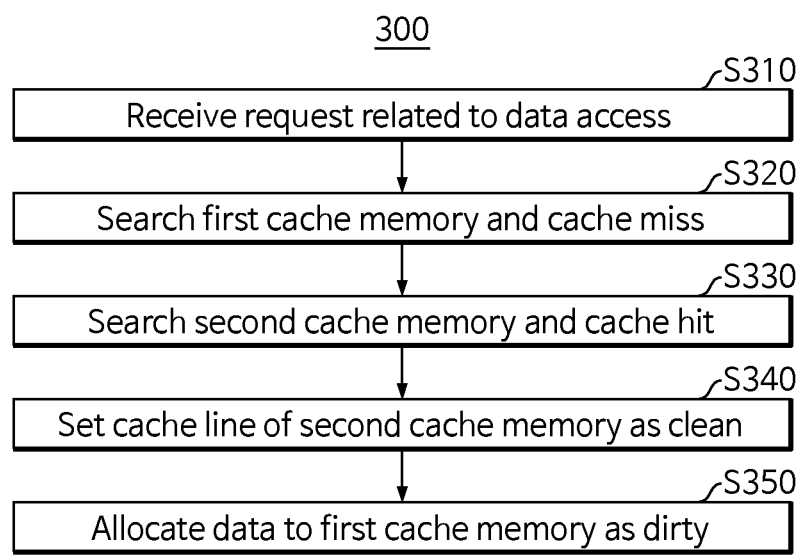
FIG. 3 is a flowchart provided to explain a data management method in a multiprocessor system.

FIG. 3 is a flowchart 300 provided to explain a data management method in the multiprocessor system 100. The processes illustrated in FIG. 3 may be executed by the first cache controller 220 and the second cache controller 240.

The first cache controller 220 may receive a request related to data access, at S310. The request may be a data read or write request including address information. For example, the processor 110a may generate the read request or write request for specific data, and the first cache controller 220 may receive the corresponding request.

The first cache controller 220 may search the first cache memory 210 for data in response to the request related to data access, at S320. If the data related to the request is not present in the first cache memory 210, the cache miss may occur. In other words, the first cache controller 220 may determine that the corresponding data is not present in the first cache memory 210. The first cache controller 220 or the processor 110a may determine whether to access the next level of cache memory based on this determination.

The second cache controller 240 may search the next level, that is, the second cache memory 230 for data, at S330. If the data related to the request is present in the second cache memory 230, the cache hit may occur. In other words, the second cache controller 240 may determine that the corresponding data is present in the second cache memory 230.

The second cache controller 240 may set the cache line of the second cache memory 230 corresponding to the data as a clean cache line, at S340. The second cache controller 240 may set a clean flag for the data related to the request. For example, if the data stored in the second cache memory 230 is already set with a dirty flag before the second cache controller 240 accesses, the second cache controller 240 may change the flag of the corresponding data from dirty to clean.

The first cache controller 220 may allocate the data to the first cache memory 210 as dirty, at S350. The first cache controller 220 may load the data stored in the second cache memory 230 into the first cache memory 210. The first cache controller 220 may allocate a predetermined cache line to the first cache memory 210 and store the corresponding data. In addition, the first cache controller 220 may set the dirty flag for the data stored in the first cache memory 210.

Before S310, a request related to accessing the data may be received while there is no corresponding data in the first cache memory 210 or the second cache memory 230. The first cache controller 220 and the second cache controller 240 may sequentially search the first cache memory 210 and the second cache memory 230 for the corresponding data, respectively, and be cache-missed in sequence. After the cache miss in the second cache memory 230, the second cache controller 240 may read the corresponding data from the cache memory at a lower level or from the main memory 140 and store the data in the second cache memory 230. In addition, the second cache controller 240 may set the cache line of the second cache memory 230 storing the corresponding data as the dirty cache line. Accordingly, at S320, the first cache memory 210 may have the cache miss, and at S330, the second cache memory 230 may have the cache hit. In addition, at S340, the cache line of the second cache memory 230 corresponding to the data may be changed from a dirty cache line to a clean cache line.

According to examples, a flush request may be issued after S350. The first cache controller 220 may change the dirty cache line in the first cache memory 210 to a clean cache line. For example, at S350, the dirty cache line of the first cache memory 210 storing the data may be changed to a clean cache line.

Hereinafter, a data management method in the multiprocessor system 100 will be described in more detail with reference to FIGS. 4 to 8.

Figure 4:
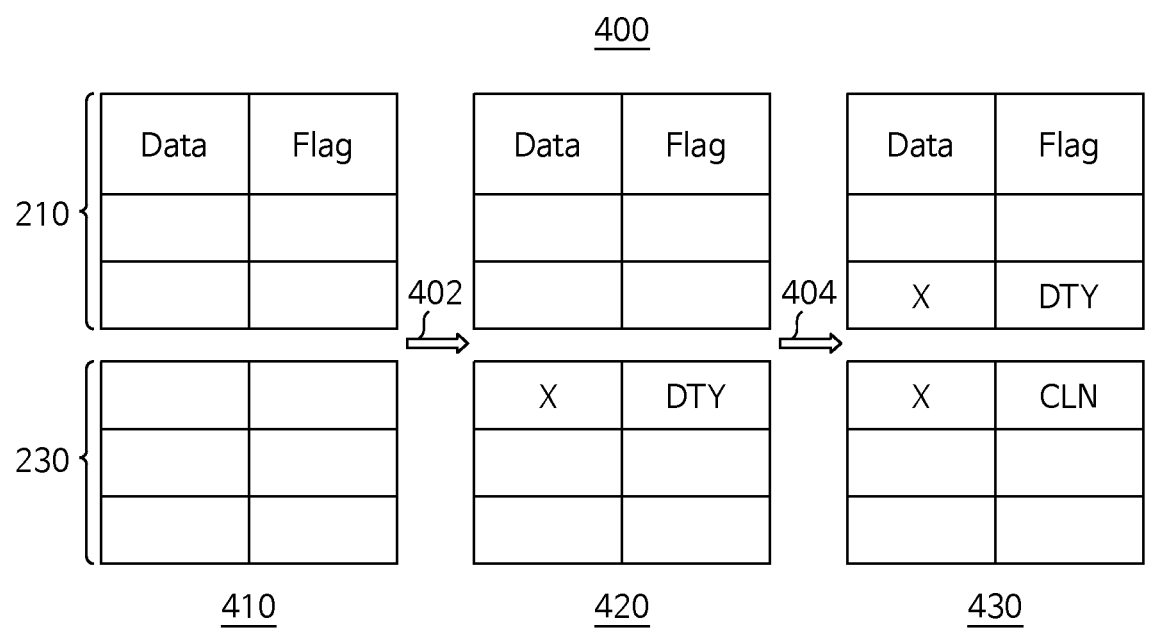
FIG. 4 is a diagram illustrating a process of processing a request related to data access in a cache memory at different levels.
Figure 5:
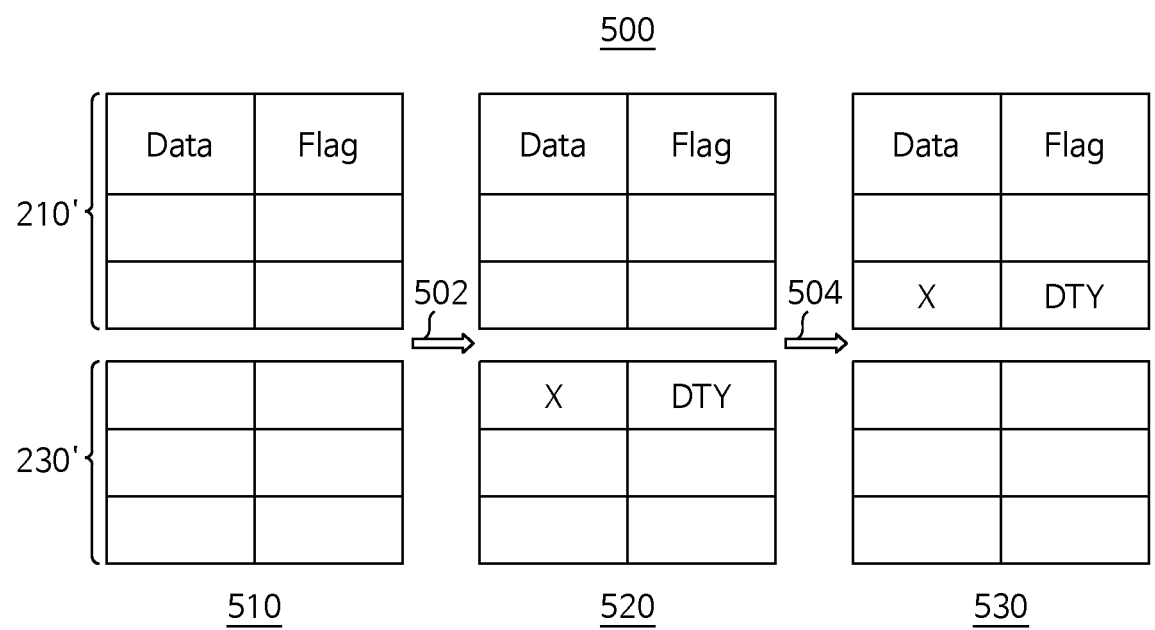
FIG. 5 is a diagram illustrating a process of processing a request related to data access in a cache memory at different levels according to a comparative example.

FIG. 4 is a diagram 400 illustrating a process of processing a request related to data access in the cache memory at different levels. In addition, FIG. 5 is a diagram 500 illustrating a process of processing a request related to data access in the cache memory at different levels according to a comparative example. The first cache memory 210 of FIG. 4 and the first cache memory 210' of FIG. 5 may be of read-allocate write-back type, and the second cache memory 230 of FIG. 4 and the second cache memory 230' of FIG. 5 may be of write-allocate write-back type.

According to an example, the operation of FIG. 4 may be executed by the first cache controller 220 and the second cache controller 240. The processor 110a may generate a write request 402 for data 'X'. In a first state 410 in FIG. 4, the data 'X' related to the request 402 is not stored in the first cache memory 210 and the second cache memory 230. The first cache controller 220 may search the first cache memory 210 for the data 'X' related to the request from the processor 110a. As a result of the search, the first cache controller 220 may determine that the corresponding data is not stored in the first cache memory 210 (i.e., cache miss). The second cache controller 240 may search the second cache memory 230 for the data 'X' related to the request. As a result of the search, the second cache controller 240 may determine that the corresponding data is not stored in the second cache memory 230 (i.e., cache miss).

In response to the cache miss, the second cache controller 240 may read the data 'X' from the cache memory at a lower level than the second cache memory 230 or from the main memory 140 and store the data 'X' in the second cache memory 230. As a result of this processing, a second state 420 follows. The second cache controller 240 may allocate any one of a plurality of cache lines of the second cache memory 230 and store the data 'X' in the allocated cache line. The second cache controller 240 may set the allocated cache line as a dirty cache line.

In the second state 420, the processor 110a may again generate a read request 404 for the data 'X'. The first cache controller 220 may search the first cache memory 210 for the data 'X'. As a result of the search, the first cache controller 220 may determine that the corresponding data is not stored in the first cache memory 210 (i.e., cache miss). The second cache controller 240 may search the second cache memory 230 for the data 'X' related to the request 404. As a result of the search, the second cache controller 240 may determine that the corresponding data is stored in the second cache memory 230 (i.e., cache hit).

In response to this determination, the second cache controller 240 may change the cache line storing the data 'X' in the second cache memory 230 from a dirty cache line to a clean cache line. In addition, the first cache controller 220 may allocate any one of a plurality of cache lines of the first cache memory 210 and store the data 'X' therein. In this case, the cache line storing the data 'X' in the first cache memory 210 may be set as a dirty cache line. Accordingly, a change from the second state 420 to a third state 430 may be done.

According to the comparative example, it may be assumed that the first cache memory 210' and the second cache memory 230' are implemented with the exclusive method. Referring to FIG. 5, a first state 510 may be the same as or similar to the first state 410 of FIG. 4. In other words, in the first state 510 of FIG. 5, data 'X' related to a write request 502 is not stored in the first cache memory 210' or the second cache memory 230'. The cache controller according to the comparative example may determine a cache miss in the first cache memory 210' and a cache miss in the second cache memory 230' in sequence.

A second state 520 of FIG. 5 may be the same as or similar to the second state 420 of FIG. 4. With respect to the second state 520, the cache controller according to the comparative example may read the data 'X' from the cache memory at a lower level than the second cache memory 230' or from the main memory and store the data 'X' in the second cache memory 230'. A cache line storing the data 'X' in the second cache memory 230' may be set as a dirty cache line.

In the second state 520, a read request 504 for the data 'X' may be generated again. In response to the read request 504, the cache controller according to the comparative example may read the data 'X' from the second cache memory 230' and store the data 'X' in the first cache memory 210'. A cache line storing the data 'X' in the first cache memory 210' may be set as a dirty cache line. Since the first cache memory 210' and the second cache memory 230' are implemented with the exclusive method, the cache line storing data 'X' in the second cache memory 230' may be invalidated. As a result of this processing, a third state 530 follows.

It may be assumed that in the third state 530, a request related to accessing the data 'X' is generated again, and a cache miss occurs in the first cache memory 210'. In this case, the possibility of cache hit in the second cache memory 230' may be significantly reduced. Accordingly, the second cache memory 230' also has a cache miss, which may cause great damage to the overall system performance.

On the other hand, because the multiprocessor system 100 supports caching of the second cache memory 230, the cache hit rate of the second cache memory 230 is not lowered. In the third state 430 of FIG. 4, the cache line of the second cache memory 230 storing the data 'X' is not invalidated and is set as a clean cache line. Even in a situation in which the request related to accessing the data 'X' is generated again in the third state 430 and the cache miss occurs in the first cache memory 210, the possibility of a cache hit occurring in the second cache memory 230 increases. Accordingly, in the multiprocessor system 100 according to the present disclosure, even if a cache miss occurs in the first cache memory, the probability of occurrence of cache hits in the second cache memory is higher than that of the comparative example, and accordingly, the overall system performance is improved.

Figure 6:
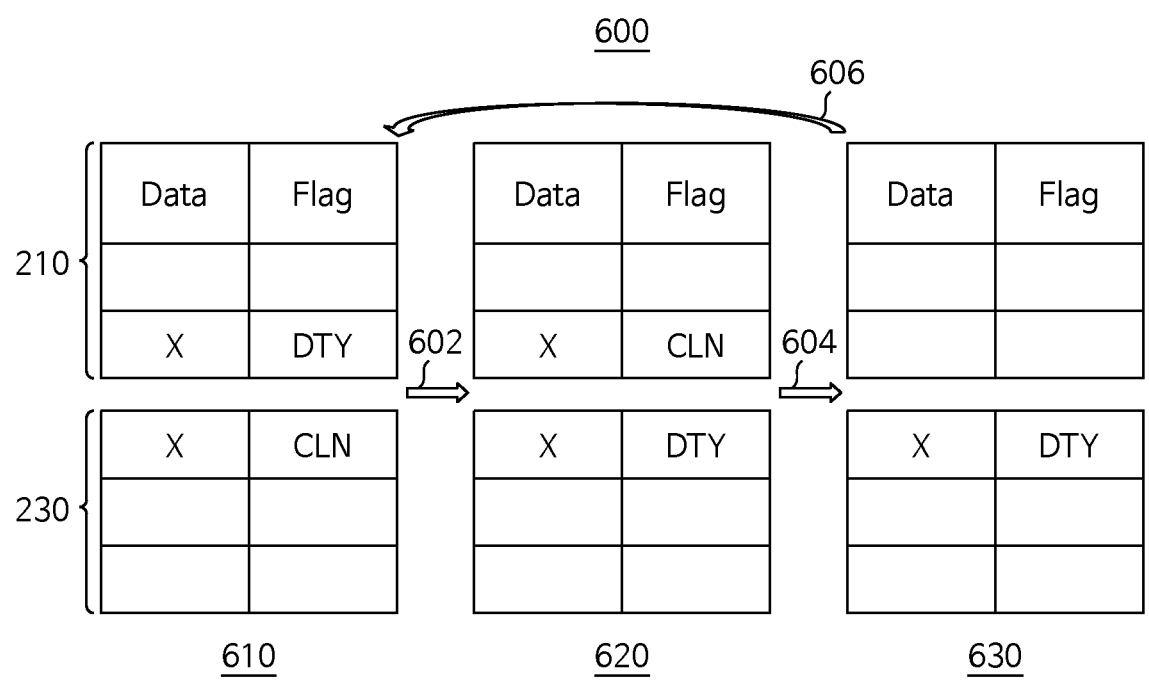
FIG. 6 is a diagram illustrating a process of processing a flush request in a cache memory.
Figure 7:
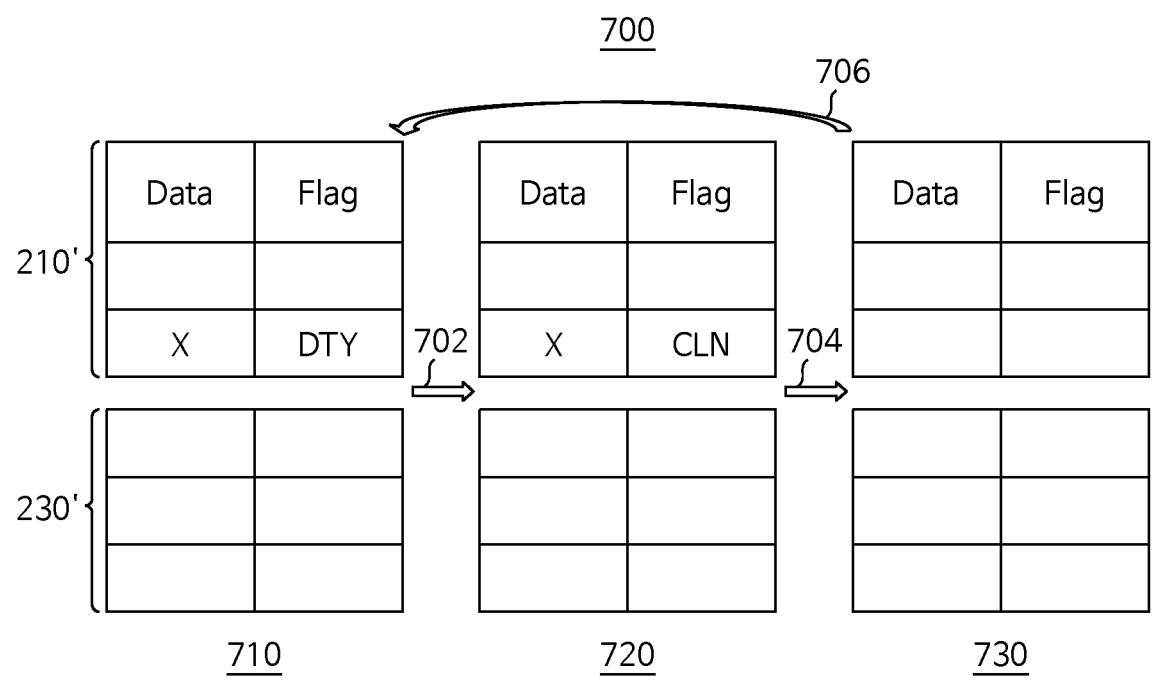
FIG. 7 is a diagram illustrating a process of processing a flush request in a cache memory according to a comparative example.

FIG. 6 is a diagram 600 illustrating a process of processing a flush request in the cache memory. In addition, FIG. 7 is a diagram 700 illustrating a process of processing a flush request in the cache memory according to a comparative example. The first cache memory 210 of FIG. 6 and the first cache memory 210' of FIG. 7 may be of read-allocate write-back type, and the second cache memory 230 of FIG. 6 and the second cache memory 230' of FIG. 7 may be of write-allocate write-back type.

According to an example, the operation of FIG. 6 may be executed by the first cache controller 220 and the second cache controller 240. A first state 610 may be the same as or similar to the third state 430 of FIG. 4. In other words, in the first state 610 of FIG. 6, data 'X' is stored in the first cache memory 210 and the second cache memory 230. The data 'X' is set as a dirty cache line in the first cache memory 210, and set as a clean cache line in the second cache memory 230.

The processor 110a may issue a flush request 602 or command for various purposes. For example, a flush request may be issued to maintain cache coherence when there is a change in the data in the cache memory or a change in the main memory. According to the flush request, in the memory layer structure, a process of copying the data between the cache memories or between the cache memory and the main memory and invalidating stored data may be performed.

According to the flush request 602, the first cache controller 220 may determine to store, in the second cache memory 230, data set as a dirty cache line in the first cache memory 210. Accordingly, the second cache controller 240 may allocate any one of the plurality of cache lines of the second cache memory 230 and store the data in the allocated cache line. The cache line allocated to the second cache memory 230 may be a dirty cache line. The first cache controller 220 may change the dirty cache line storing the data 'X' in the first cache memory 210 to a clean cache line. As a result of this processing, the first state 610 is changed to a second state 620.

In the second state 620, the first cache controller 220 may invalidate the cache line storing the data 'X' according to a victim request 604. As a result of this processing, the second state 620 is changed to a third state 630.

In the third state 630, the processor 110a may generate again a request 606 for accessing the data 'X'. For example, if the request is a read request, a cache hit in the second cache memory 230 follows the cache miss in the first cache memory 210. After the cache hit in the second cache memory 230, the second cache controller 240 may change the cache line storing the data 'X' in the second cache memory 230 from a dirty cache line to a clean cache line. In addition, the first cache controller 220 may allocate a cache line from the first cache memory 210, store the data 'X' therein, and set the corresponding cache line as a dirty cache line. As a result of this processing, the third state 630 is changed back to the first state 610. As described above, in the multiprocessor system 100, even if the flush request, the victim request, and the data access request are repeated, only the first cache memory 210 is flushed, and the second cache memory 230 is not flushed. As a result, the overall performance of the multiprocessor system 100 can be improved.

According to the comparative example, it may be assumed that the first cache memory 210' and the second cache memory 230' are implemented with the exclusive method. Referring to FIG. 7, a first state 710 may be the same as or similar to the third state 530 of FIG. 5. In other words, in the first state 710 of FIG. 7, data 'X' is stored in the first cache memory 210', and the data 'X' is not stored in the second cache memory 230'. The data 'X' is set as a dirty cache line in the first cache memory 210.

According to a flush request 702, the cache controller according to the comparative example may change the dirty cache line storing the data 'X' in the first cache memory 210 to a clean cache line. In addition, the data 'X' stored in the first cache memory 210 may be stored in the cache memory at a lower level than the second cache memory 230' or in the main memory 140. As a result of this processing, the first state 710 is changed to a second state 720.

In the second state 720, the cache controller according to the comparative example may invalidate the cache line storing the data 'X' according to a victim request 704. As a result of this processing, the second state 720 is changed to a third state 730.

In the third state 730, the processor 110a may generate again a request 706 to access the data 'X'. For example, if the request is a read request, the data 'X' may be read from the cache memory at a lower level than the second cache memory 230' or from the main memory 140, after the cache miss in the first cache memory 210' and the second cache memory 230'. The read data 'X' may be stored in the first cache memory 210' as a dirty cache line. As a result of this processing, the third state 730 is changed back to the first state 710.

The comparative example has a disadvantage that the processing speed is relatively low, because the data is stored in the cache memory at a lower level than the second cache memory 230' or in the main memory 140 by the flush request, and the data is loaded from the cache memory at a lower level than the second cache memory 230' or from the main memory 140 by the read request. On the other hand, the multiprocessor system 100 has an advantage that the processing speed is relatively high, because the data is stored in the second cache memory 230 by the flush request and the data is loaded from the second cache memory 230 by the read request.

Figure 8:
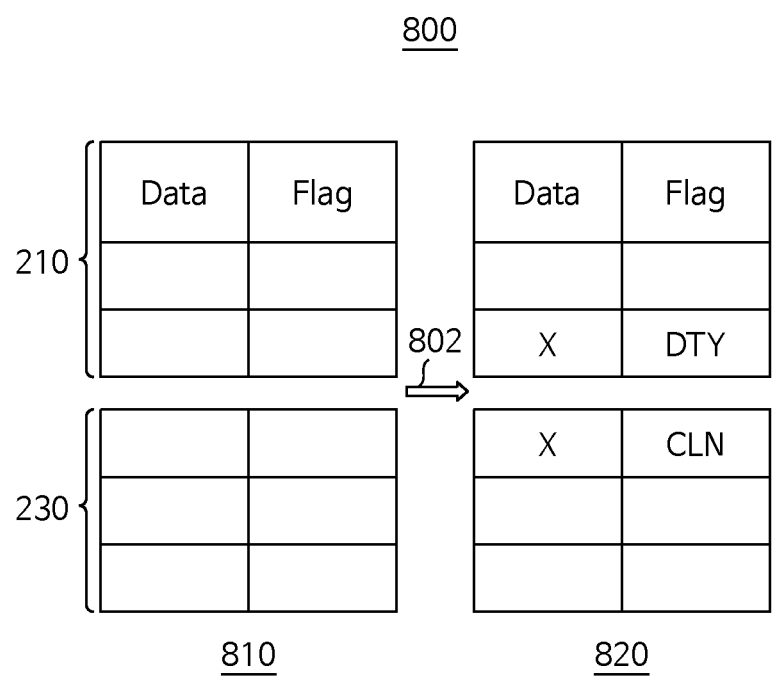
FIG. 8 is a diagram illustrating a process of processing a request related to data access in a cache memory at different levels.

FIG. 8 is a diagram illustrating a process of processing a request related to data access in the cache memory at different levels. The first cache memory 210 of FIG. 8 may be of write-allocate write-back type, and the second cache memory 230 may be of read-allocate write-back type.

According to an example, the operation of FIG. 8 may be executed by the first cache controller 220 and the second cache controller 240. The processor 110a may generate a write request 402 for data 'X'. In a first state 410 in FIG. 4, the data 'X' related to the request 402 is not stored in the first cache memory 210 and the second cache memory 230. The first cache controller 220 may search the first cache memory 210 for the data 'X' related to the request from the processor 110a. As a result of the search, the first cache controller 220 may determine that the corresponding data is not stored in the first cache memory 210 (i.e., cache miss). The second cache controller 240 may search the second cache memory 230 for the data 'X' related to the request. As a result of the search, the second cache controller 240 may determine that the corresponding data is not stored in the second cache memory 230 (i.e., cache miss).

In response to the cache miss, the second cache controller 240 may read the data 'X' from the cache memory at a lower level than the second cache memory 230 or from the main memory 140 and store the data 'X' in the second cache memory 230. The second cache controller 240 may set the allocated cache line as a clean cache line. In addition, the first cache controller 220 may read the data 'X' from the second cache memory 230 and store the data 'X' in the first cache memory 210. The first cache controller 220 may set the allocated cache line as a dirty cache line. As a result of this processing, a second state 820 follows.

Accordingly, even if a flush request is received in the second state 820, the first cache controller 220 may change the dirty cache line storing the data 'X' in the first cache memory 210 to a clean cache line, and the second cache controller 240 may change the clean cache line storing the data 'X' in the second cache memory 230 to a dirty cache line. By this processing, even if an access request for the data 'X' is received again and a cache miss occurs in the first cache memory 210, the probability of occurrence of cache hits in the second cache memory 230 may increase.

On the other hand, in the comparative example in which the first cache memory 210 and the second cache memory 230 are exclusively implemented, there is a disadvantage that the probability of occurrence of cache hits in the second cache memory is low when the cache miss occurs in the first cache memory.

Figure 9:
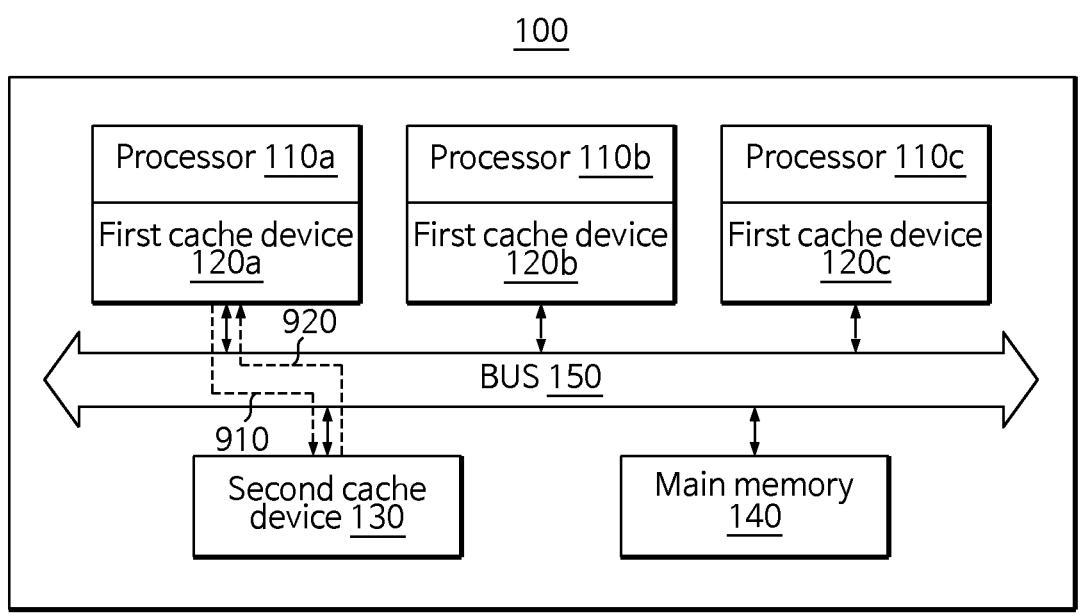
FIG. 9 is a diagram illustrating how a data management method is implemented on a bus.

FIG. 9 is a diagram illustrating how a data management method is implemented on the bus 150.

In the multiprocessor system 100 according to the present disclosure, a data management method may be executed using an AXI protocol. According to the present disclosure, if a cache miss occurs in the first cache memory 210, according to the AXI protocol, the first cache controller 220 may transmit, to the second cache device 130, an AXI signal 910 indicating that data having a cache miss is cacheable in the first cache memory 210. If a request related to data 'X' is cache-missed in the first cache memory 210 in the second state 420 of FIG. 4, the first cache controller 220 may transmit the AXI signal 910 for notifying that a cache miss was occurred in the cacheable area of the first cache memory 210, to the second cache device 130 through the bus 150. For the AXI signal 910, an AXI AR user bit may be utilized, for example. The first cache controller 220 may set the corresponding user bit as "1" to indicate a situation in which the cache miss was occurred in the cacheable area of the first cache memory 210 and issue traffic to the second cache device 130. If the corresponding traffic is a cache hit in the second cache memory 230, and if the cache line is a dirty cache line, the second cache device 130 may change the corresponding cache line to a clean cache line.

According to the present disclosure, if a cache hit occurs in the second cache memory 230, according to the AXI protocol, the second cache controller 240 may transmit, to the first cache device 120a, an AXI signal 920 indicating that a cache line corresponding to the data having the cache miss occurred is set as a clean cache line. If the request 404 related to the data 'X' in the second state 420 of FIG. 4 is cache-hit in the second cache memory 230 and so the flag for the data 'X' is changed from dirty to clean, the second cache controller 240 may transmit, to the first cache device 120a through the bus 150, the AXI signal 920 for notifying that the cache line of the second cache memory 230 storing the data 'X' is set as a clean cache line. For example, an AXIR user bit may be used for the AXI signal 920. The second cache controller 240 may set the corresponding user bit as "1" to indicate that the flag for the cache-hit data is set as clean, and issue traffic to the first cache device 120a. The first cache device 120a may allocate a dirty cache line when caching data having a corresponding user bit '1'.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. A multiprocessor system comprising:
a plurality of processors:
a first cache device corresponding to a first processor of the plurality of processors, and including a first cache memory configured to store a plurality of first cache lines; and
a second cache device at a lower level than the first cache device, corresponding to the plurality of processors, and including a second cache memory configured to store a plurality of second cache lines,
wherein the second cache device is configured to:
in response to a first request related to accessing predetermined data, search the second cache memory for the data; and
in response to the data being cache-missed in the second cache memory, read the data from a cache memory at a lower level than the second cache device or from a main memory, allocate any one of the plurality of second cache lines of the second cache memory and store the data, and set a cache line corresponding to the data, of the plurality of second cache lines, as a dirty cache line,
the first cache device is configured to:
after the first request, search the first cache memory for the data in response to a second request related to accessing the data,
the second cache device is configured to:
in response to the data being cache-missed in the first cache memory, search the second cache memory for the data; and
in response to the cache-missed data in the first cache memory being cache-hit in the second cache memory, change the cache line corresponding to the data of the plurality of second cache lines of the second cache memory from the dirty cache line to a clean cache line, and
the first cache device is configured to:
allocate any one of the plurality of first cache lines of the first cache memory and store the data, and set a cache line corresponding to the data, of the plurality of first cache lines, as a dirty cache line.

2. The multiprocessor system according to claim 1, wherein the first cache device is further configured to, according to a flush request for the first cache memory, change the allocated cache line of the first cache memory from the dirty cache line to a clean cache line.

3. The multiprocessor system according to claim 1, wherein the first cache device is further configured to, in response to the data being cache-missed in the first cache memory, according to AXI protocol, transmit, to the second cache device, a signal indicating that the data is cacheable in the first cache memory.

4. The multiprocessor system according to claim 1, wherein the second cache device is further configured to, in response to the data being cache-hit in the second cache memory, according to AXI protocol, transmit, to the first cache device, a signal indicating that the cache line of the second cache memory corresponding to the data is set as the clean cache line.

5. The multiprocessor system according to claim 1, wherein the first cache memory and the second cache memory are of write-back type.

6. The multiprocessor system according to claim 1, wherein the first cache memory is of read-allocate write-back type, and the second cache memory is of write-allocate write-back type.

7. A multiprocessor system comprising:
a plurality of processors:
a first cache memory corresponding to each of the plurality of processors;
a first cache controller configured to read data from the first cache memory or write data to the first cache memory;
a second cache memory corresponding to the plurality of processors; and
a second cache controller configured to read data from the second cache memory or write data to the second cache memory,
wherein the second cache controller is configured to:
in response to a first request related to accessing predetermined data, search the second cache memory for the data; and
in response to the data being cache-missed in the second cache memory, read the data from a cache memory at a lower level than the second cache memory or from a main memory, allocate any one of a plurality of second cache lines of the second cache memory and store the data, and set a cache line corresponding to the data, of the plurality of second cache lines, as a dirty cache line, the first cache controller is configured to:
  after the first request, receive a second request related to accessing the data from a first processor of the plurality of processors; and
  in response to the second request, search the first cache memory corresponding to the first processor for the data, the second cache controller is configured to:
  in response to the data being cache-missed in the first cache memory, search the second cache memory for the data; and
  in response to the cache-missed data in the first cache memory being cache-hit in the second cache memory, change the cache line corresponding to the data of the plurality of second cache lines of the second cache memory from the dirty cache line to a clean cache line, and the first cache controller is configured to:
  allocate any one of a plurality of first cache lines of the first cache memory and store the data, and set a cache line corresponding to the data, of the plurality of first cache lines, as a dirty cache line.

8. A data management method of a system, wherein the system comprises: a plurality of processors; a first cache memory corresponding to a first processor of the plurality of processors, and a first cache controller; and a second cache memory at a different level from the first cache memory and corresponding to the plurality of processors, and a second cache controller, the method comprising:

by the second cache controller, in response to a first request related to accessing predetermined data, searching the second cache memory for the data;

by the second cache controller, in response to the data being cache-missed in the second cache memory, reading the data from a cache memory at a lower level than the second cache memory or from a main memory, allocating any one of a plurality of second cache lines of the second cache memory and storing the data, and setting a cache line corresponding to the data, of the plurality of second cache lines, as a dirty cache line;

by the first cache controller, after the first request, according to a second request related to accessing the data generated by the first processor, searching the first cache memory for the data;

by the second cache controller, in response to the data being cache-missed in the first cache memory, searching the second cache memory for the data;

by the second cache controller, in response to the data cache-missed in the first cache memory being cache-hit in the second cache memory, changing the cache line corresponding to the data of the plurality of second cache lines of the second cache memory from the dirty cache line to a clean cache line; and by the first cache controller, allocating any one of a plurality of first cache lines of the first cache memory and storing the data, and setting a cache line corresponding to the data, of the plurality of first cache lines, as a dirty cache line.

9. The method according to claim 8, further comprising, according to a flush request for the first cache memory, changing the allocated line of the first cache memory from the dirty cache line to a clean cache line.

10. The method according to claim 8, wherein the searching the second cache memory for the data includes in response to the data being cache-missed in the first cache memory, according to AXI protocol, receiving a signal indicating that the data is cacheable in the first cache memory.

11. The method according to claim 8, wherein the changing the cache line of the second cache memory from the dirty cache line to the clean cache line includes, in response to the data being cache-hit in the second cache memory, according to AXI protocol, transmitting a signal indicating that the cache line of the second cache memory corresponding to the data is set as the clean cache line.

* * * * *